United States Patent [19]

Guiguet

[11] Patent Number: 4,933,127
[45] Date of Patent: Jun. 12, 1990

[54] PROCESS FOR IMPROVING THE SLIP PROPERTIES OF A SKI SOLE MADE OF POWDERED HIGH DENSITY POLYETHYLENE OF VERY HIGH MOLECULAR WEIGHT

[75] Inventor: Jacques Guiguet, Voiron, France

[73] Assignee: Skis Rossignol S.A., France

[21] Appl. No.: 279,934

[22] Filed: Dec. 2, 1988

[30] Foreign Application Priority Data

Dec. 4, 1987 [FR] France .................. 87 17189

[51] Int. Cl.⁵ .............................................. B29C 47/54
[52] U.S. Cl. .................................. 264/80; 156/82; 156/244.16; 156/244.17; 264/22; 264/126; 264/162; 264/169; 264/171; 264/237; 264/284; 264/323; 264/324
[58] Field of Search ............... 264/210.2, 237, 22, 264/80, 284, 162, 171, 169, 126, 323, 324; 156/244.16, 244.17, 82; 425/204–205, 197–199

[56] References Cited

U.S. PATENT DOCUMENTS

| | | | |
|---|---|---|---|
| 3,665,068 | 5/1972 | Duling et al. | 264/211 |
| 3,711,067 | 1/1973 | Kovacs | 425/207 |
| 3,883,631 | 5/1975 | Murray | 425/327 |
| 4,352,766 | 10/1982 | Bradley et al. | 264/120 |
| 4,462,852 | 7/1984 | Custor | 264/132 |
| 4,540,195 | 9/1985 | Smith-Johannsen | 156/244.12 |
| 4,587,163 | 5/1986 | Zachariades | 264/331.17 |
| 4,616,059 | 10/1986 | Motooka et al. | 264/210.5 |
| 4,643,865 | 2/1987 | Okada et al. | 264/288.4 |
| 4,769,433 | 9/1988 | Chanzy et al. | 264/290.5 |

Primary Examiner—Jeffery Thurlow
Attorney, Agent, or Firm—Wall and Roehrig

[57] ABSTRACT

A process for improving the slip properties of a ski sole that includes instantaneously compressing a high density polyethylene powder to soften the material and passing the softened material through a static mixer and a grid. The material is then shaped in an extruder and the extruded tape cooled by passing it between cooling plates prior to its being placed on a storage reel.

5 Claims, 1 Drawing Sheet

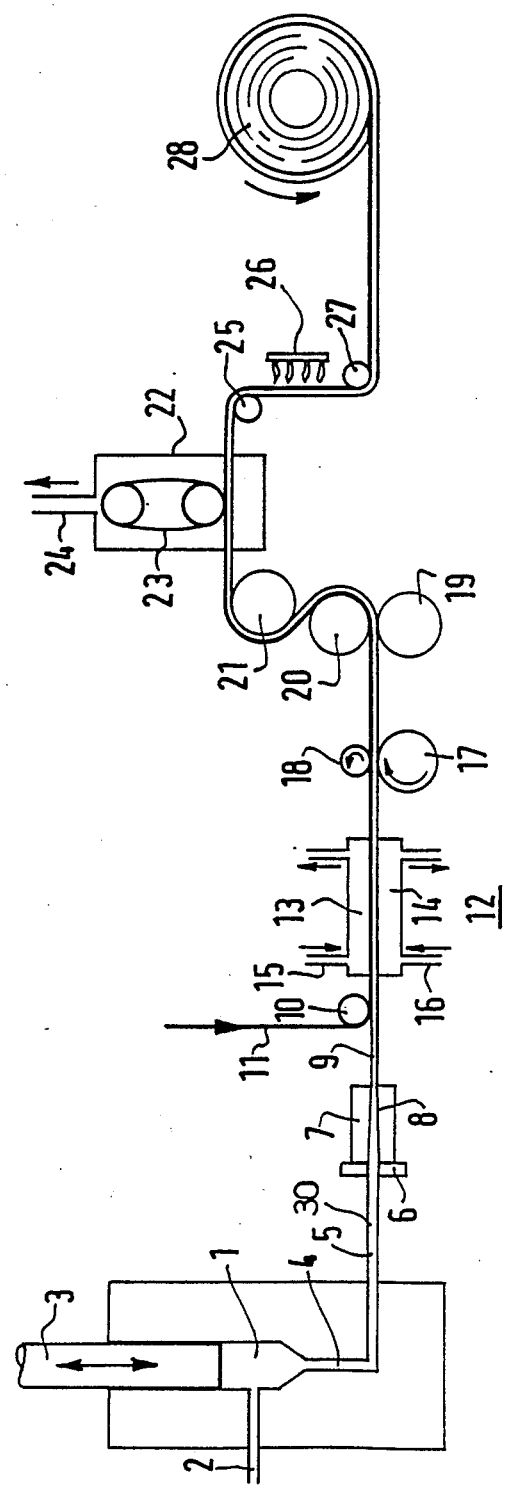

PROCESS FOR IMPROVING THE SLIP PROPERTIES OF A SKI SOLE MADE OF POWDERED HIGH DENSITY POLYETHYLENE OF VERY HIGH MOLECULAR WEIGHT

The invention relates to an improved process for improving the slip properties of a ski sole made of high density polyethylene of very high molecular weight.

As is known, ski soles are currently made of high density polyethylene (HDPE) obtained by the so-called "low pressure" process.

BACKGROUND OF THE INVENTION

It has first of all been suggested to produce these soles by starting with polymers in the form of granules which are extruded in the form of tape by means of a conventional process, particularly by means of a single- or twin-screw extruder, followed by a calender whose rolls have an adjustable gap. The process involved is very simple and quite economical, but has the disadvantage of resulting in soles whose abrasion resistance is limited with time.

To overcome these disadvantages it has been suggested, therefore, to employ high density polyethylene, no longer in the form of granules but of powder, that is to say having a very high molecular weight (higher than $5 \times 10^5$, preferably higher than $1 \times 10^6$). Unfortunately, this polymer cannot be extruded in a conventional manner in an extruder of the screw and barrel type because its very high melt viscosity requires motors of high power and oversized barrels which are difficult to control in respect of temperature. This results in selfheating of the polymer, which then rapidly degrades.

It has therefore been suggested to sinter this polymer, particularly by compacting the powder in a cylindrical mold, followed by pressing at a high pressure for an appreciable time at elevated temperature. The pancake thus obtained is then demolded and sliced with unwinding to obtain a polyethylene sheet of appropriate thickness which is rubbed down and then flamed to make it receptive to adhesive bonding. The thickness of the pancake corresponds to the width of the tape to be obtained. The slip and abrasion resistance properties are markedly improved in this manner. However, this process is time-consuming, requires repetitions and consequently results in costly products.

The invention overcomes these disadvantages. Its objective is a process for the manufacture of ski soles of high density polyethylene which makes use of a continuous extrusion process, and which is therefore economical and which does not degrade the properties of the material, thus retaining the qualities of the sole made of high density polyethylene of high molecular weight which is usually obtained by sintering.

SUMMARY OF THE INVENTION

This process for improving the slip properties of a ski sole made of high density polyethylene of molecular weight above $1 \times 10^6$ consists in continuously:

feeding a chamber with the said polyethylene in the form of powder, using a hopper;

subjecting the said powder in the said chamber to an instantaneous compression under a pressure of a least a thousand bars for compacting and softening the said polyethylene powder by means of a fusion effect;

in transferring the polymer thus softened and melted successively into a heated enclosure comprising a static mixer, and then passing it through a filter grid;

then extruding the polymer thus mixed and filtered through a heated die with shaping lips with a profile drawn out in the direction of travel of the polymer and whose exit cross section corresponds to the desired cross section of the tape;

then cooling and shaping the tape obtained by passing between two cooled plates whose separation corresponds to the exit cross section of the die and to the cross section of the tape;

then drawing the cooled tape obtained using a haul-off whose peripheral speed is equal to the speed of extrusion;

and, finally, receiving the treated tape in the form of a reel.

In other words, the invention consists in having selected and arranged in a precise order operations which are, to be sure, known per se, but so as to work towards a new result, namely the production of a ski sole made of polyethylene of very high molecular weight by extrusion instead of sintering, whose slip qualities are improved.

Advantageously, in practice:

the extrusion of the high density polyethylene powder of very high molecular weight is carried out in a known manner in a ram extruder such as, for example, an extruder of the type of those described in documents FR-A-1, 538,988 (corresponding to document GB-A-1,158,011), DE-A-1,729,174 (corresponding to document US-A-3,954,372), DE-A-1,778,258 and 2,829,232 (corresponding to document GB-A-2,024,701);

the die with shaping lips has plates which are removable in the lengthwise direction and intended to permit an adjustment of the drawn-out profile and of the thickness of the tape;

each of the two plates of the cooling unit consists of a plate which is actually planar over an appreciable proportion of its opposed face, cooled by water circulation; in an alternative embodiment, the shaping lips of the die may have a profile whose cross section is U-shaped. In this case, the two plates of the cooling unit are shaped to as to correspond to the said profile;

between the haul-off and the cooling unit, a pair of rolls may be inserted, in the gap between which the cooled tape travels, comprising a first roll whose periphery comprises a relief pattern intended to be printed onto the contact face of the tape, this relief having an appropriate pattern for promoting the ability of the polyethylene to slip, and a second smooth press roll;

before the cooling unit, a textile strengthening reinforcement or a transferable film carrying a pattern capable of being sublimed when hot may be interposed onto one of the faces of the tape which is still hot;

after the haul-off train but before the reeling, the tape passes continuously over a rubbing-down unit followed by a dust removal unit;

after the dust removal the treated tape passes continuously over a plasma treatment unit intended to make the polyethylene receptive to adhesive bonding and/or to silk-screen printing and/or lacquering;

the plasma treatment is performed according to a process chosen within the group consisting of flaming and the corona effect.

DESCRIPTION OF THE DRAWING

The way in which the invention may be implemented and the advantages which stem therefrom will become more apparent from the example of embodiment which follows, supporting the sole attached figure which shows diagramatically a plant according to the invention.

DESCRIPTION OF THE INVENTION

This plant comprises firstly an extruder whose chamber (1) is fed with high density polyethylene powder of very high molecular weight ($1 \times 10^6$ and above) using a hopper spilling into a channel (2) and in which a ram (3) driven in a reciprocal motion is acting, after the manner of what is described in the above-mentioned patents, especially FR- A-1,538,988 (GB-A-1,158,011), thereby generating an instantaneous compression of the polymer. As a result, the pressure prevailing in the whole of the device described is at least equal to a thousand bars and can reach ten thousand bars, when this is needed. This compacting produces a softening followed by the melting of the polymer.

The molten polymer flows out through the channel (4) from which it enters a heated enclosure (5) comprising a static mixer (30) of a type known per se, of the cross or helix type. A "static mixer" refers to a device which makes it possible simultaneously to homogenize and to compact the said polymer. A uniform melting of the said polymer is thus obtained at the exit of the mixer. Furthermore, this mixer makes it possible to obtain a color which is also uniform, when required, by homogenizing the masterbatch and the basic polymer powder.

The polymer thus mixed then passes through a fine and strong filter grid (6) made of steel or even of stainless steel. In the embodiment described, the grid apertures (6) are square-shaped with a side of 0.5 millimeters.

The polymer then enters the heated die (7) whose shaping lips (8) are, in lengthwise cross section, inclined towards the exit so as to impart the desired dimensions (width and thickness) onto the tape (9). These shaping lips (8) consist of plates which are removable in the lengthwise direction and the exit gap of these plates is adjustable and corresponds to the desired thickness of the tape (9). As already stated, these lips are interchangeable, each set of lips being intended for a given thickness and shape of the tape (9). Thus, it is obvious that a U shape can be given to the tape at the end of the said shaping lips.

A textile strengthening reinforcement (11), used as an adhesive bonding intermediate, or else a film capable of being transferred and carrying a pattern which can be sublimed when heated, is applied onto one of the faces of this tape (9) which is still hot, by means of a return roller (10) in contact with the tape.

The whole then enters a cooling unit indicated using the general reference (12), consisting of two parallel plates (13, 14) made of polished aluminum cooled by water circulation (15, 16). It should be noted that the gap and the shape of the plates (13, 14) correspond respond to those of the die (7), particularly at the exit of the shaping lips (8). Thus, if the tape is U-shaped on leaving the shaping lips (8), the plates (13,14) are shaped correspondingly.

The cooled tape next runs over a train of rolls consisting of a first roll (17) whose periphery comprises a relief intended to be printed onto the lower face of the tape, with an appropriate pattern to promote slipping of the polyethylene, and a smooth second pressing roll (18) intended to apply this relief properly. It is obvious that the face of the tape which is intended to come into contact with the relief roll (17) is not that which might have received the textile strengthening reinforcement (11).

The tape is then hauled continuously by a hauloff train consisting, in a known manner, of a set of parallel driving rolls (19, 20, 21) maintained at ambient temperature and whose peripheral speed of rotation is the same as that of extrusion.

The drawn tape next runs through a rubbing-down station (22) where it is subjected to the action of an endless abrasive sheet (23) in which the dust is removed by suction in a known manner at (24). After a return roller (25), the rubbed-down tape next runs past a flaming station (26), in order to make the polyethylene suitable for adhesive bonding and/or for silk-screen printing or else for lacquering, depending on the circumstances. Obviously, when the tape has received a textile strengthening structure on one of its faces, the rubbing-down (22) and the flaming (26) operations on the same face become unnecessary.

In a similar manner, the drawn tape may be subjected to corona discharges instead and in the place of the flaming described above.

By virtue of a return roll (27), the finished tape is then rewound in reel form (28).

The high density polyethylene tape of very high molecular weight prepared in accordance with the invention exhibits good abrasion resistance and excellent slip properties. As a result, it is perfectly suitable for the manufacture of ski soles.

What is claimed is:

1. A method for continuously processing high density, high molecular weight polyethylene to produce a ski sole ribbon having improved sliding properties and abrasion resistance that includes the steps of
   feeding high density polyethylene powder material having a molecular weight greater than $1 \times 10^6$ through a compression chamber,
   instantaneously subjecting the polyethylene powder material in the chamber to a compressive force equal to, or greater than, one thousand bars to soften and then melt the material by fusion,
   passing the melted material leaving the compression chamber through a static mixer to homogenize said material to a uniform consistency,
   passing the material leaving the static mixer through a filter grid having openings therein of a uniform size into a heated shaping die,
   extruding the material between the separated lips of the shaping die to produce a continuous ribbon of material having a desired contour,
   cooling the ribbon as it is extruded from the shaping die between two cooling members having a separation profile corresponding to that of the lips of the shaping die,
   drawing the cooled ribbon onto a pull train that is moving at the same peripheral speed as the speed at which the ribbon is extruded from the shaping die,
   finishing the surface of the ribbon as it moves along the pull train, and
   winding the finished ribbon onto a storage reel.

2. The method of claim 1 that includes the further step of passing the ribbon leaving the cooling elements through a pair of rollers to impress a final pattern to one face of the ribbon.

3. The method of claim 2 that includes the further step of sanding and flaming the other face of the ribbon as it passes along the pull train.

4. The method of claim 2 that includes the further step of applying a textile coating to the other face of the ribbon prior to the ribbon being cooled between the cooling members.

5. The method of claim 1 wherein said material in said chamber is compressed by a reciprocating ram that is mounted in said chamber whereby said material is fed to the shaping die in a continuous stream.

* * * * *